US008904350B2

(12) United States Patent
Mahmud

(10) Patent No.: US 8,904,350 B2
(45) Date of Patent: Dec. 2, 2014

(54) MAINTENANCE OF A SUBROUTINE REPOSITORY FOR AN APPLICATION UNDER TEST BASED ON SUBROUTINE USAGE INFORMATION

(75) Inventor: Jalal U. Mahmud, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 13/334,033

(22) Filed: Dec. 21, 2011

(65) Prior Publication Data
US 2013/0167113 A1    Jun. 27, 2013

(51) Int. Cl.
G06F 9/44    (2006.01)

(52) U.S. Cl.
USPC ......................................................... 717/120

(58) Field of Classification Search
None
See application file for complete search history.

(56) References Cited

U.S. PATENT DOCUMENTS

| | | | |
|---|---|---|---|
| 5,629,878 A | 5/1997 | Kobrosly | |
| 6,347,398 B1* | 2/2002 | Parthasarathy et al. | 717/178 |
| 8,626,675 B1* | 1/2014 | Satish | 706/12 |
| 2008/0065928 A1* | 3/2008 | Suzuki et al. | 714/3 |
| 2008/0320462 A1* | 12/2008 | Bergman et al. | 717/168 |
| 2009/0288070 A1 | 11/2009 | Cohen et al. | |
| 2009/0327913 A1* | 12/2009 | Adar et al. | 715/745 |
| 2010/0114939 A1 | 5/2010 | Schulman et al. | |

OTHER PUBLICATIONS

Zaidman et al, 2008 International Conference on Software Testing, Verification, and Validation, "Mining Software Repositories to Study Co-Evolution of Production & Test Code".*
Anonymous, "Method for Updating Changed Graphic User Interface (GUI) Objects in the Test Script Automatically," IP.com PriorArt Database, IP.com No. IPCOM000210885D, IP.com Electronic Publication, Sep. 14, 2011.
Mahmud et al., "Lowering the Barriers to Website Testing with CoTester", ACM IUI 2010 Conference, Feb. 2010, China.
Li et al., "Here's What I Did: Sharing and Reusing Web Activity with ActionShot," Proceedings of CHI 2010, ACM, 2010.

* cited by examiner

Primary Examiner — Don Wong
Assistant Examiner — Daxin Wu
(74) Attorney, Agent, or Firm — Cantor Colburn LLP; Libby Toub

(57) ABSTRACT

Embodiments of the invention relate to maintaining a repository of subroutines used by a software program under test based on an analysis of subroutine usage logs. One aspect of the invention concerns a system for analyzing a log of subroutine usage by an application under test to identify subroutines used by the application based on actions in the subroutines, and comparing the identified subroutines against a repository of subroutines applicable to the application. The system may further designate a subroutine in the repository as a matching subroutine, modify or delete a subroutine, or add a new subroutine to the repository.

10 Claims, 12 Drawing Sheets

Usage Log 1 go to "travelsite.com"
click the "travel" link
enter "1234678434" into "Account Login" textbox
enter your password into "password" textbox
click the "Log in" button
. . . . .

— 432

Usage Log 2 go to "travelsite.com"
click the "airlines" link
enter "2222222333" into "Account Login" textbox
enter your password into "password" textbox
click the "Log in" button
. . . . .

— 433

. . . .

Usage Log n go to "travelsite.com"
. . .
enter "441212333" into "Account Login" textbox
enter your password into "password" textbox
click the "Log in" button
. . .

— 434

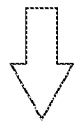

Identified Subroutine S1:

enter X into "Account Login" textbox
enter your password into "password" textbox
click the "Log in" button

Subroutine Usage Logs

Usage Log 1

650 →

```
go to "travel-site.com"
click the "travel" link
enter "1234678434" into "Account Login" textbox
turn on the "remember me" checkbox
enter your password into "password" textbox
click the "Log in" button
...
```
— 651

Usage Log 2

```
go to "travel-site.com"
click on "check in" link
enter "2222222333" into "Account Login" textbox
turn on the "remember me" checkbox
enter your password into "password" textbox
click the "Log in" button
...
```
— 652

Usage Log 3

```
go to "travel-site.com"
click the "check in" link
enter "A1213334" into "Confirmation Number:" textbox
enter "John" into "First Name:" textbox
enter "Smith" into "Last Name:" textbox
click the "Check In" button
...
```
— 653

MAINTENANCE OF A SUBROUTINE REPOSITORY FOR AN APPLICATION UNDER TEST BASED ON SUBROUTINE USAGE INFORMATION

BACKGROUND

Embodiments of the invention relate generally to software testing, and more particularly, to automatic maintenance of subroutines applicable to a software application under test.

Software testers often create test scripts to test different functions of an application under test. A test script generally includes a step-by-step process to invoke specific functions of the application and verify that the functions correctly perform the intended tasks. The script for testing a particular function of the application may include the scripts of common sub-processes used for other functions. These sub-processes are often referred to as subroutines or sub-tests. For example, test scripts for a Web application being tested may include a common sequence of steps for logging on to a Web site that include entering an ID and a password, and clicking on a "Log in" button. Software testers may label such subroutines with keywords to uniquely identify them and facilitate the maintenance of the test scripts. An application under test may, however, continuously change during its development. As a result, a step-by-step process that corresponds to a subroutine may also need to be modified to remain useful.

Creating and maintaining the test subroutines may be a manual process in a testing system. For example, the testers may manually create new keywords for new subroutines or modified subroutines. Such a manual process is generally not practical for testing a major software product in which a large number of subroutines may be generated and continuously updated.

BRIEF SUMMARY

Exemplary embodiments of the invention relate to analyzing logs of subroutine usage by an application being tested to automatically maintain a subroutine repository. The embodiments of the invention may be implemented in a stand-alone testing system or incorporated into other test utilities in a comprehensive testing system. The application under test may be a Web application, a database application, or other computer software programs undergoing a functional testing.

One aspect of the invention concerns a method for maintaining a subroutine repository for an application under test. The method may comprise analyzing a log of subroutine usage by the application under test to identify subroutines used by the application based on actions in the subroutines, comparing the identified subroutines against a repository of subroutines applicable to the application, and designating a subroutine in the repository as a matching subroutine based on the analysis.

Another aspect of the invention concerns a system for maintaining a subroutine repository for an application under test. The system may comprise a memory for storing a log of subroutine usage by the application under test, and a processor coupled to the memory and configured to analyze the log to identify the subroutines used by the application based on actions in the subroutines. The processor may be configured to compare the identified subroutines against a repository of subroutines applicable to the application, and designate a subroutine in the repository as a matching subroutine if the designated subroutine is used by the application.

A further aspect of the invention concerns a computer program product for maintaining a subroutine repository for an application under test. The computer program product comprises a computer readable storage medium having computer readable program code embodied therewith. The computer program product may comprise computer readable program code configured to analyze a log of subroutine usage by an application under test to identify the subroutines used by the application based on actions in the subroutines. The computer readable program code may be configured to compare the identified subroutines against a repository of subroutines applicable to the application, and designate a subroutine in the repository as a matching subroutine if the designated subroutine is used by the application.

The details of the preferred embodiments of the invention, both as to its structure and operation, are described below in the Detailed Description section in reference to the accompanying drawings. The Summary is intended to identify key features of the claimed subject matter, but it is not intended to be used to limit the scope of the claimed subject matter.

BRIEF DESCRIPTION OF THE SEVERAL VIEWS OF THE DRAWINGS

FIG. 4 illustrates an example of subroutine usage logs from which the subroutines used by an application under test may be identified, according to an embodiment of the invention;

FIG. 6 illustrates another example of subroutine usage logs from which multiple subroutines used by an application under test may be identified, according to an embodiment of the invention;

DETAILED DESCRIPTION

Figure 1:
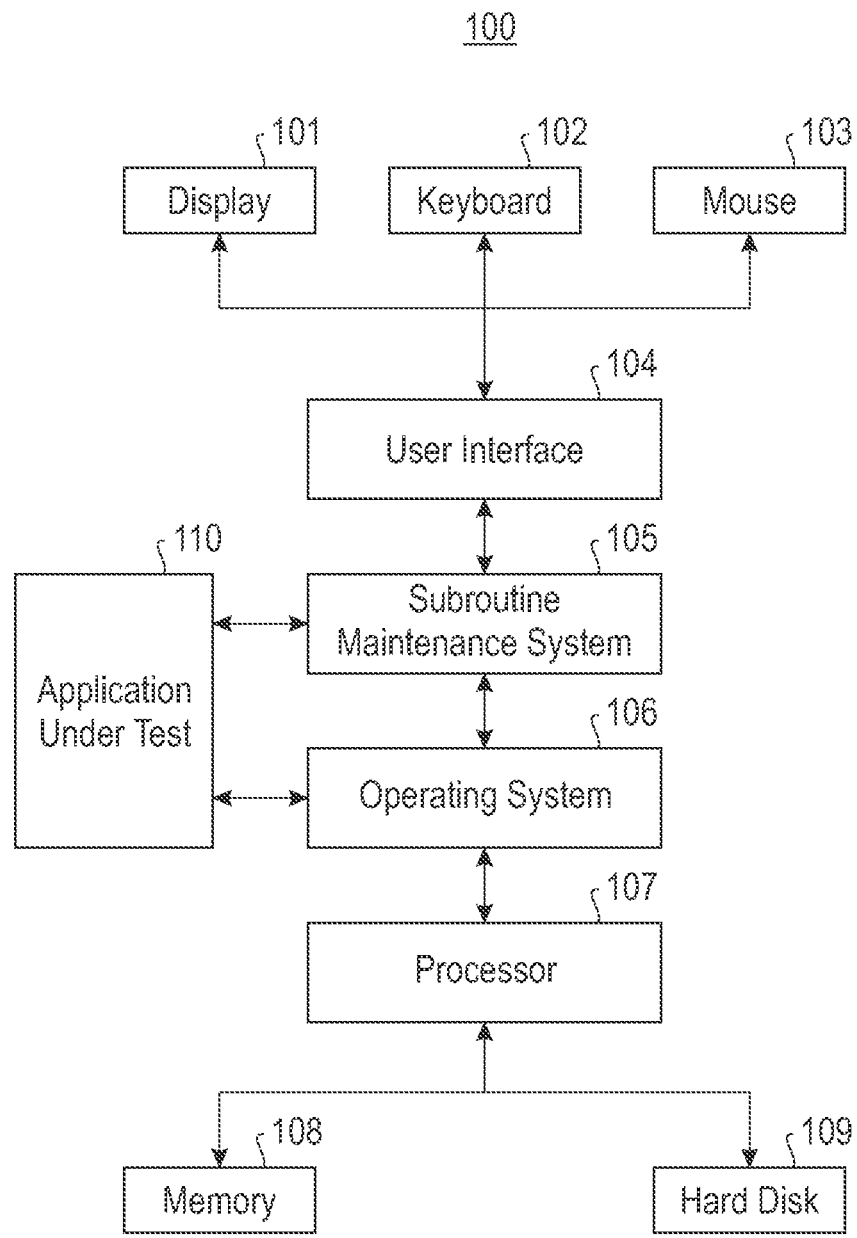
FIG. 1 illustrates an exemplary block diagram of software and hardware components in a computer system that a software tester may use to maintain a repository of subroutines applicable to an application under test, according to an embodiment of the invention.

The invention relates to methods, systems, and computer program products for analyzing logs of subroutine usage by an application being tested to automatically maintain a repository of subroutines that an application under test may need for operation. For the purposes of explaining the invention, certain exemplary embodiments are described in the context of a web application under test, however, the embodiments are not limited only to a web application environment and may be applicable to other computer applications such as database, user interface, and communication applications.

Software testers spend a significant amount of time during the product development phase to test and verify the operation of a software product. A defect in the software product that is discovered during test may be corrected more quickly and economically than after the product is shipped to customers and the defect is subsequently discovered in the field. As software applications become larger and include more complex functions, such as mixed multimedia and web utilities, the testing of such applications becomes even more time-consuming. As a result, software testers continuously look for areas to automate the testing tasks as much as possible. One of the tasks that is well suited for automation and would significantly save a tester's time is the tracking and updating of the subroutines that an application under test may invoke in operation.

Traditionally, a tester may manually identify the subroutines applicable to an application under test and set up these subroutines before or during test so that the subroutines are available to the application when the application needs them. Some testing systems may include automated functions such as scanning the code of the application to identify the subroutines that may be used by the application during a test. However, most testing systems still require certain manual tasks and configuration by a user to set up and manage the subroutines used by the application.

An automated maintenance of the subroutines invoked by the application under test would significantly benefit software testers. For example, as a large application is continuously updated by the development team during a product development cycle, the automated subroutine maintenance system may continuously analyze subroutine usage logs during test and update a repository of applicable subroutines accordingly with little manual intervention by the testers. The automated subroutine maintenance system may provide a repository of subroutines that closely matches the subroutines used by the application being tested and increases the overall efficiency of the testing phase.

Exemplary embodiments of the invention may automatically maintain a repository of subroutines or sub-processes that are repeatedly used by an application under test based on an analysis of subroutine usage information. The embodiments may initialize the subroutine repository with a list of subroutines that are known to be applicable to the application. The subroutine usage information may comprise usage logs that have been pre-processed and converted to a script format to facilitate the analysis to identify the subroutines.

The analysis performed by the embodiments of the invention may include segmenting the subroutine usage logs into sequences of related user or program activities where the segmentation is based on a time period. The embodiments may map the sequences of user or program activities into sequences of action classes in order to generalize the identified subroutines. For example, entering user name into "user name" text box, entering password into "password" textbox, and clicking the "login" button are conceptually similar as entering user name into "user name" text box, entering password into "password" textbox and clicking the "Log in" button. Accordingly, the embodiments of the invention may map the actions of clicking the "login" button and clicking the "Log in" button to the same action-class.

The exemplary embodiments of the invention may compare the sequences of actions classes to identify common substrings among the sequences using a sequence similarity metric. In one embodiment, such similarity metric may be a Longest Common Subsequences (LCS) metric, which is commonly used for determining sequence similarity. Each identified common substrings is a subroutine that is used by one of the processes in the application under test. The subroutines that are identified from the usage logs as being invoked by the application are compared to the subroutines in the repository to update the repository accordingly.

To identify subroutines used by the application under test, embodiments of the invention may process subroutine usage logs into a format more suitable for pattern detection. For example, the embodiments may segment the logs of web actions and instructions into sequences of web actions and instructions using a heuristic segmentation process. Each sequence may comprise one or more sequences of executable instructions or web actions. The embodiments may further map each of the instructions into an abstracted instruction which is referred to as an instruction class or action class to facilitate the identification of the subroutines.

Referring now to the drawings and in particular to FIG. 1, there is illustrated a block diagram of exemplary programs and hardware components in a computer system 100 for maintaining subroutines that may be used by an application under test, according to an embodiment of the invention. The computer system 100 may include a display 101 for presenting information such as computer programs and data to a user. The user may operate a keyboard 102 and a mouse 103 to enter data and user input to the computer. User input and output information may be processed by a user interface component 104 in the computer system 100. The computer system 100 generally includes an operating system 106 for managing the operation of various hardware and components and programs in the computer system 100. Hardware resources may comprises a processor 107 for executing program instructions, a memory 108 for temporarily storing data during a program execution, and a hard disk 109 for storing data for longer periods of time.

One of the software programs running in the computer system 100 may be a subroutine maintenance system 105 for identifying and managing subroutines that an application 110 may need during a test of the application 110. The application under test 110 is also under the control of operating system 106 and interacts with the subroutine maintenance system 105. Through the user interface 104, a user or software tester may provide input to and receive output from the subroutine maintenance system and the application 110 during a test of the application 110. The subroutine maintenance system 105 is now described in detail with reference to FIGS. 2-8.

Figure 2:
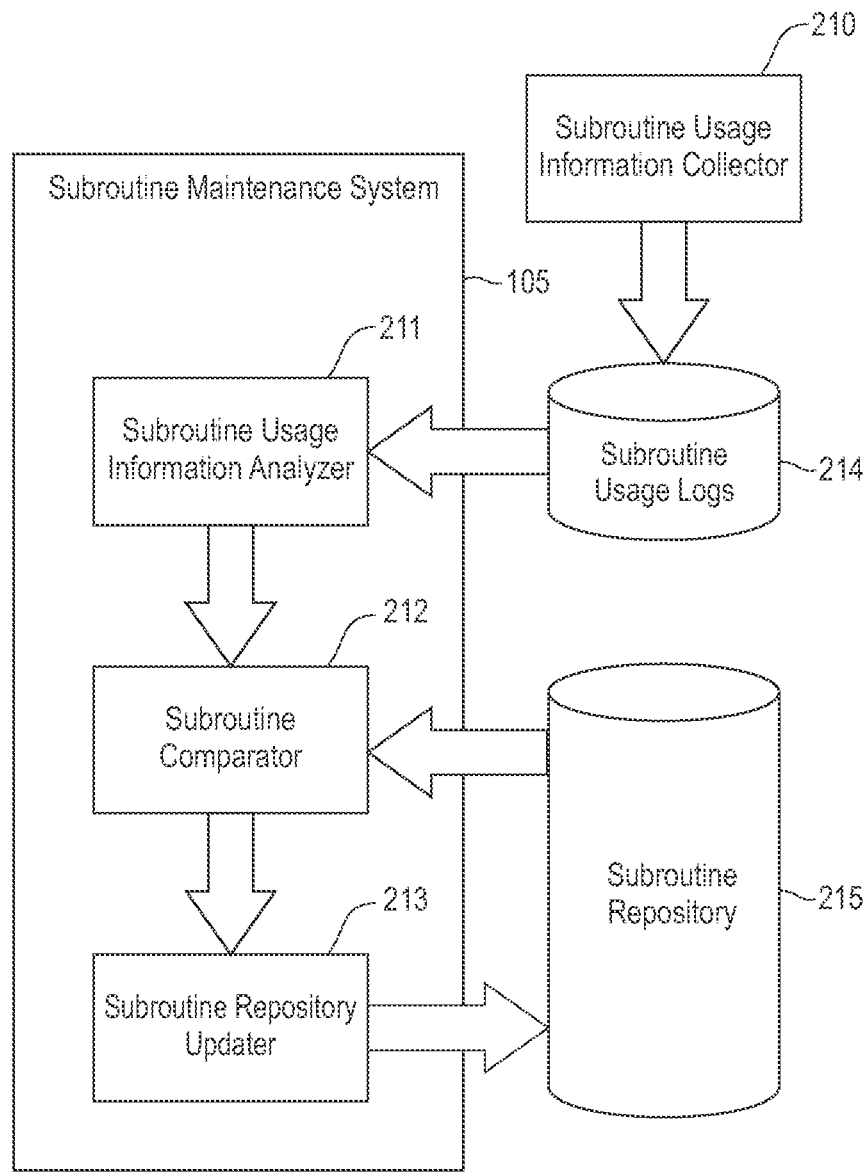
FIG. 2 illustrates an exemplary block diagram of a subroutine maintenance system to provide a repository of subroutines applicable to an application user test based on an analysis of subroutine usage logs, according to an embodiment of the invention.

FIG. 2 illustrates an exemplary block diagram of a subroutine maintenance system 105 for automatically maintaining subroutines that the application under test 110 may need based on subroutine usage logs, according to an embodiment of the invention. At a high level, a software testing system may periodically collect information on subroutine usage by the application 110 under test and store the information as subroutine usage logs 214. The subroutine maintenance system 105 may analyze the collected subroutine usage logs 214 to identify subroutines that the application 110 may use in operation. The identified subroutines are compared to a repository 215 of subroutines that may be applicable to the application 110.

Based on the comparison between the identified subroutines and those in the repository 215, the subroutine maintenance system 105 may update the subroutine repository 215 with newly identified subroutines, modified subroutines, or information to indicate that certain subroutines in the repository 215 are consistent with those used by the application 110.

In analyzing subroutine usage information logs 214 to identify subroutines used by the application under test 110, the subroutine maintenance system 105 may employ various processes to detect related user or program actions that make up a subroutine. For example, the subroutine maintenance system 105 may segment the subroutine usage information logs 214 into sequences of related actions using time-based heuristic processes. Each user or program action may be mapped to a generalized action class. A sequence of related user and program actions is thus transformed into a sequence of actions classes.

The subroutine maintenance system 105 may then analyze the sequences of action classes to identify common substrings which are repeated among the sequences, for example, from actions by multiple users. A common substring that is at least of a predetermined length and is repeated at least a predetermined number of times among the sequences of action classes may be considered as a candidate to be output as a subroutine used by the application under test. The subroutine maintenance system 105 may return the candidate subroutine as a sequence of action classes corresponding to the actions in the candidate subroutine.

Figure 3:
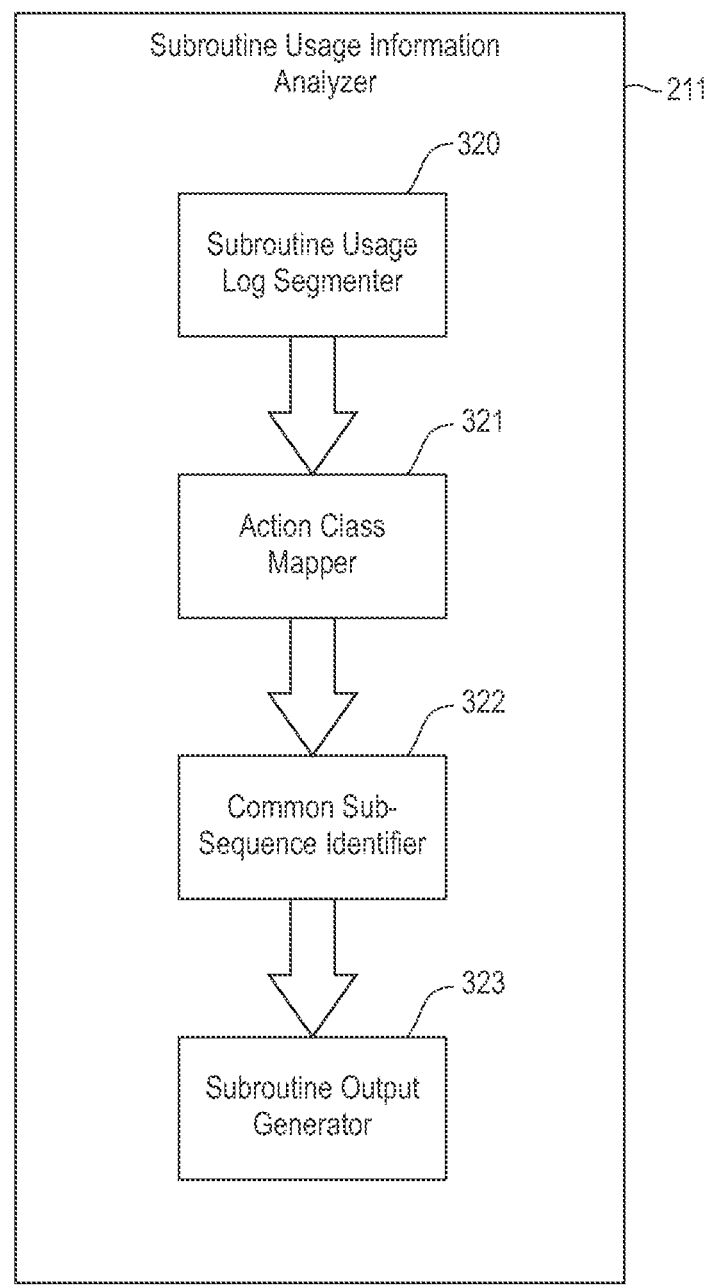
FIG. 3 illustrates an exemplary block diagram of a subroutine usage information analyzer for identifying subroutines used by an application under test from the subroutine usage logs, according to an embodiment of the invention.

Exemplary components in the subroutine maintenance system 105 illustrated in FIGS. 2-3 are now described with reference the examples of subroutine usage logs, subroutine actions and action classes identified from analysis of the subroutine usage logs, and resulting repositories of subroutines shown in FIGS. 4-8. A software testing may include may include a subroutine usage information collector 210 for acquiring data on the subroutines that an application 110 under test may use when the application 110 is running. In one embodiment, the application under test 110 may be a web application and the subroutine usage logs 214 may comprise web interaction history logs by one or more web users. FIG. 4 illustrates an example web log 431 which includes web logs 432-434 associated with different web users.

A web history log 431 may be generated as a result of recording user interactions with different web sites using a web history recording tool, such as the recording tool described in the paper entitled "Here's What I Did: Sharing and Reusing Web Activity with ActionShot," Proceedings of CHI 2010, ACM, 2010. In that case, the recorded steps contain an interaction with a web page item (e.g., clicking a button, entering a text into a textbox) or visiting to a website (e.g., going to a URL). A web interaction recorder, as part of the usage information collector 210, may simply output the recorded web interactions to a subroutine usage information storage area 214.

In another embodiment, a web log 431 may contain sequences of web page URLs, along with web pages that were visited, the type of web actions performed at each interaction, and an XPATH of a DOM tree node which was accessed at each step. Such a web log 431 may be obtained by a browser plug-in which monitors user interactions in a website and records user interactions in the web log. For such a web log, the usage information collector 210 may output user actions in the ClearScript language for each web interaction to a web history log. The web history log 431 may be pre-processed to facilitate its analysis using a pre-processing utility such as the one described in the paper entitled "Lowering the Barriers to Website Testing Using CoTester", IUI 2010, ACM 2010. The pre-processed web log may be in the form of web log 421 in FIG. 4, which may include multiple groups 422-424 of web actions where each group comprises user actions that are related to a web transaction.

Once the subroutine usage logs 214 such as history log 431 of web actions are in a format suitable for pattern detection, a subroutine usage information analyzer 211 in the subroutine maintenance system 105 may analyze the subroutine usage logs 214 to identify subroutines used by the application under test 110. An example of the subroutines that the information analyzer 211 may identify from the web user logs 421 is the subroutine 435 illustrated in FIG. 4. The analysis of the subroutine usage logs 214 may involve segmenting the usage logs 214 to detect sequences of related program or user actions from the information and classifying similar user or program actions into actions classes to generalize functionally similar tasks. The output from the subroutine usage information analyzer 211 may be one or more subroutines used by the application user test 110. An exemplary embodiment the subroutine usage information analyzer 211 is described in detail below with reference to FIG. 3

Figure 5:
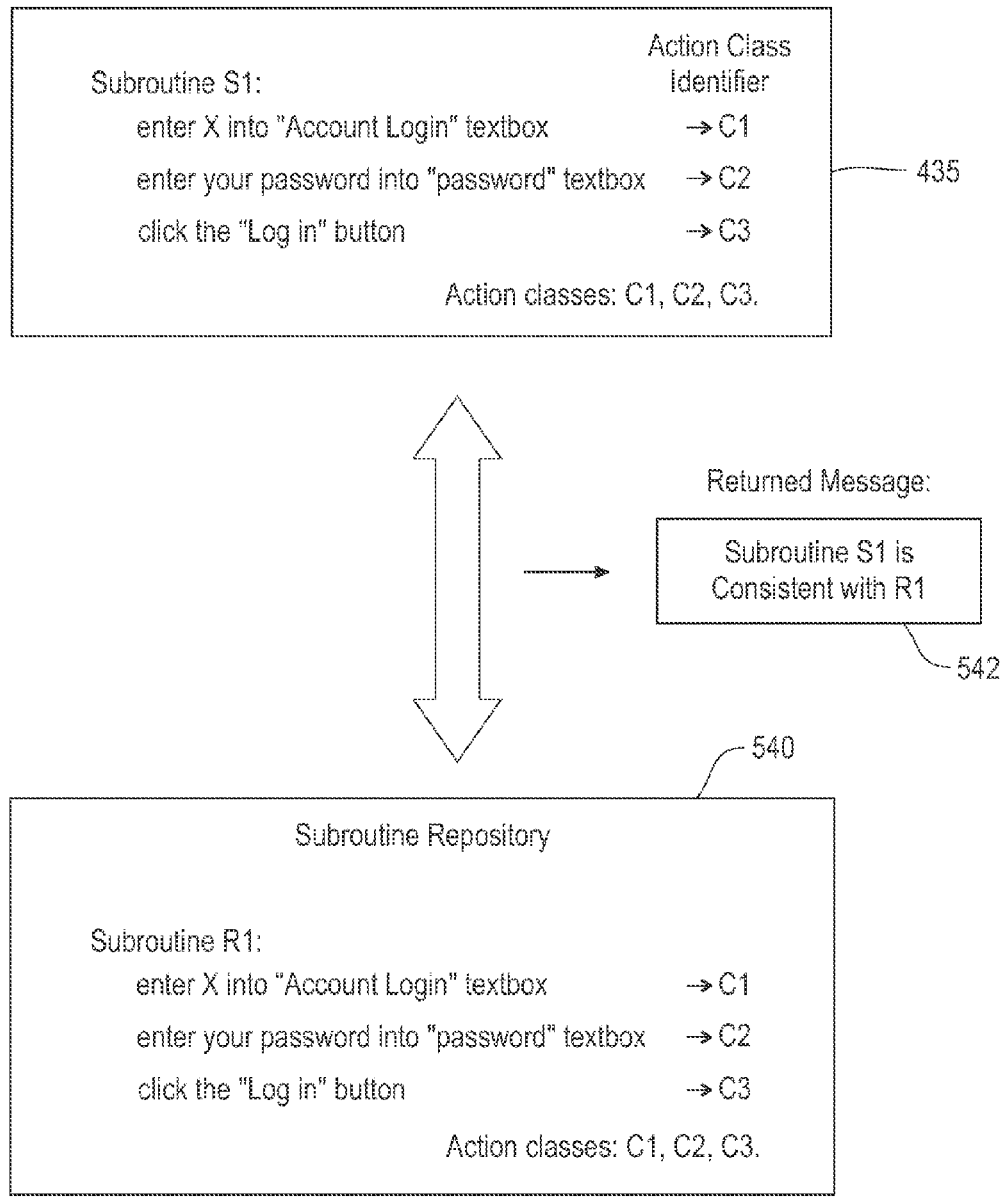
FIG. 5 illustrates a comparison between a subroutine identified from the subroutine usage logs and a subroutine repository based on action classes in the subroutines, according to an embodiment of the invention.

A subroutine comparator 212 may compare the subroutines identified by the subroutine usage information analyzer 211 to the subroutines currently maintained in a subroutine repository 215. A software tester may have initialized the subroutine repository 215 with a list of subroutines that the tester knows to be applicable to the application 110 being tested. FIG. 5 illustrates an example of comparing the subroutines identified from subroutine usage logs 214 against the subroutine repository 215. In this example, the repository 540 currently includes one subroutine R1 which might have been provided by a software tester during an initialization. Using the subroutine S1 (435) which the usage information analyzer 211 has identified from web user log 431, the subroutine comparator 212 may compare the subroutine S1 (435) against the subroutine R1 in the repository 540 and conclude that there is a match. The subroutine comparator 212 may return a message 542 to the tester that the subroutine S1 (435) and the subroutine R1 in repository 540 are consistent with each other.

Referring again to FIG. 2, depending on the results of the subroutine comparison, the subroutine maintenance system 105 may further update the subroutine repository 215 with newly found subroutines or modified subroutines, and deleting certain subroutines from the subroutine repository 215. The subroutine maintenance system 105 may comprise a subroutine updating component 213 for handling the task of updating the subroutine repository 215. Examples of a newly identified subroutine and a modified subroutine being added to the subroutine repository 215 are described below with reference to FIG. 9.

FIG. 3 illustrates an exemplary block diagram of a subroutine usage information analyzer 211 for identifying from the usage logs 214 the subroutines that may be invoked by an application 110 under test, according to an exemplary embodiment of the invention. The usage information analyzer 211 may comprise a log segmenting component 320 for partitioning subroutine usage logs 214 into segments of related user or program activities. In the case of web interaction logs 431 captured from the operation of a web application, each segment may be a sequence 432-434 of related web actions. For example, related user web actions associated with an online purchase may include user clicks to open a web domain, search for a desired item, and add the item to a checkout cart, as illustrated below:

go to "http:\\www.-online-vendor.com/"
    enter "movie1 blu-ray" into the "Search" field
    click the "go" button
    click the "Movie1 (Three-Disc Extended version)
    click the first "Add to Cart" link
    click the first "Cart" link The web actions in a web log 431 may be recorded by a logging utility as a stream of web actions from which the usage information analyzer 211 may segment into sequences of web actions. Each of the sequences may consist of web actions pertaining to a particular web transaction, e.g., finding a particular online item and adding the item to a checkout cart. The segmentation of a web action stream may include identifying overlaps within the sequences to determine the boundaries of sequences of related web actions. For example, repeated selections of the "Search" buttons may occur within sequences that start with user clicks to go to a web domain and end with user clicks to add an item to a "Checkout Cart".

To measure task repetition, the usage information analyzer 211 may estimate task boundaries within each user's log data in order to extract sequences of actions over which the usage information analyzer 211 can detect repeated tasks. For example, in the case of web action logs, the segmenting component 320 may first segment the web logs per day (assuming that the web tasks did not span multiple days) for each web domain. The subroutine usage information segmenting component 320 may then segment the logs within each day using a time-based heuristic as follows. The subroutine usage information segmenting component 320 may compute the mean time between consecutive domain actions (excluding those spanning day boundaries), and then segment the logs when the time between consecutive actions exceeds one standard deviation of the mean.

Intuitively, the segmentation of the usage logs 214 may assume that the time between consecutive actions within a task is less than the time between actions across task boundaries. The subroutine usage information analyzer 211 may remove sequences of two actions or less from a resulting set of sequences as these likely do not contain repetitious behavior and add noise.

The subroutine usage information analyzer 211 may include an action class mapper 321 for grouping each set of conceptually equivalent or similar user or program actions into an action class. For example, the "Click the 'login' button" and "Click the log-in' button" actions should be considered the same when measuring repetition. The action class mapper 321 may use a conservative method for mapping user and program actions to action classes in order to preserve the underlying intention of the action taken (e.g., to insure that "Enter username" and "Enter password" are never mapped to the same class).

For example, the action class mapper 321 may interpret each Web action as a Web page command where each command contains three parts: an action type that indicates the interaction-level action taken, an object type that represents the type of page element on which the action was taken, and an object label that identifies the target element. For example, the "Click the 'login' button" action would be interpreted as the command: <'click','button','login'>.

The subroutine usage information analyzer 211 may further comprise an action class mapper 321 for mapping sequences of related user or program actions into sequences of action classes as part of the analysis of the usage information. For each action in an identified sequence of related user or program actions, the action class mapper 321 replaces the action with a corresponding action class as determined by the grouping of functionally similar actions. For example, different user web actions may be transformed into corresponding web action classes as illustrated in Table 1.

TABLE 1

| WEB ACTION | WEB ACTION CLASS |
| --- | --- |
| 1. Enter "movie1 blu-ray" into the "Search" field | Action Class A (Enter search term) |
| 2. Click the "Go" button | Action Class B (Execute Search) |
| 3. Click "Movie1 3-disc Set" | Action Class C (Select First Item) |
| 4. Click the "Add to Cart" link | Action Class D (Add to Cart button) |
| 5. Click the "Cart" link | Action Class D (Add to Cart button) |

In one embodiment of the invention, an action class sequence mapper 321 may map web commands to action classes sequentially as web commands are initiated by a user or a program. That is, a user or application command is mapped to an existing action class (that possibly contains multiple commands) if the command meets the following criteria:

The action type and object type of the incoming command are the same as that of the action class.
    The difference between the object label of the incoming command and any command in the class is less than some threshold, where the difference is measured as a string edit distance between labels. Data collected from experiments show that an edit distance threshold of three is sufficient for achieving the goal of conservatively mapping similar actions together.

If no such class existed, the action class mapper 321 may create a new action class for the incoming command.

Once the sequences of user and program actions have been mapped to sequences of action classes, the subroutine usage information analyzer 211 may analyze the sequences of action classes to identify common sub-sequences (or sub-strings) that are repeated among the sequences of action classes. Such common sub-sequences may correspond to actions of different users or programs. For example, a common sub-sequence identified from the sequences of action classes may include the three action classes <enter a "User ID", enter a "User Password", click "Log in">. The subroutine usage information analyzer 211 may include a common sub-sequence identifier 322 for analyzing the sequences of action classes to identify the common sub-sequences.

In one embodiment, the common sub-sequence identifier 322 may determine that a sub-sequence of action classes is a common sub-sequence if it occurs multiple times in the examined user logs, i.e., a program subroutine performing the actions in the sub-sequence is used multiple times by the application under test. The common sub-sequence identifier 322 may further determine a sub-sequence to be common if it satisfies a minimum length K (i.e., the sub-sequence includes a minimum number K of action classes) and is repeated in the analyzed subroutine usage information (e.g., user logs) at least N times. A measurement of commonality for this particular common sub-sequence may be derived as the product K times N. The common sub-sequence identifier 322 may use the commonality weights of the common sub-sequences to rank the sub-sequences and determine the sub-sequences that are most common among the sequences of action classes. The common sub-sequences that the sub-sequence identifier 322 identifies correspond to the subroutines that are potentially used by the application 110 under test.

In one embodiment, a subroutine output generator 323 of the subroutine usage information analyzer 211 may output a ranked list of program subroutines in the form of the identified sub-sequences of action classes. The subroutine output generator 323 may present the output subroutines in the form of action classes corresponding to the user or program actions in the common sub-sequences that were identified from the sequences of action classes.

FIG. 6 illustrates another example of user or program action logs that may be analyzed by the subroutine usage information analyzer 211. User or program action logs 650 may comprise log sequences 651-653 of related web actions by multiple Web users. For example, the sequence 652 may include web clicks by a user to access a travel web site, enter a user ID and a user password to log into a user account, and to select an option to remember the user ID for future log-in attempts. The sequence 653 may include web clicks by a user to check in for a particular flight of an airlines. The user would need to select a "Check In" link, enter a flight confirmation number and passenger name, and click on a "Check In" button.

Figure 7:
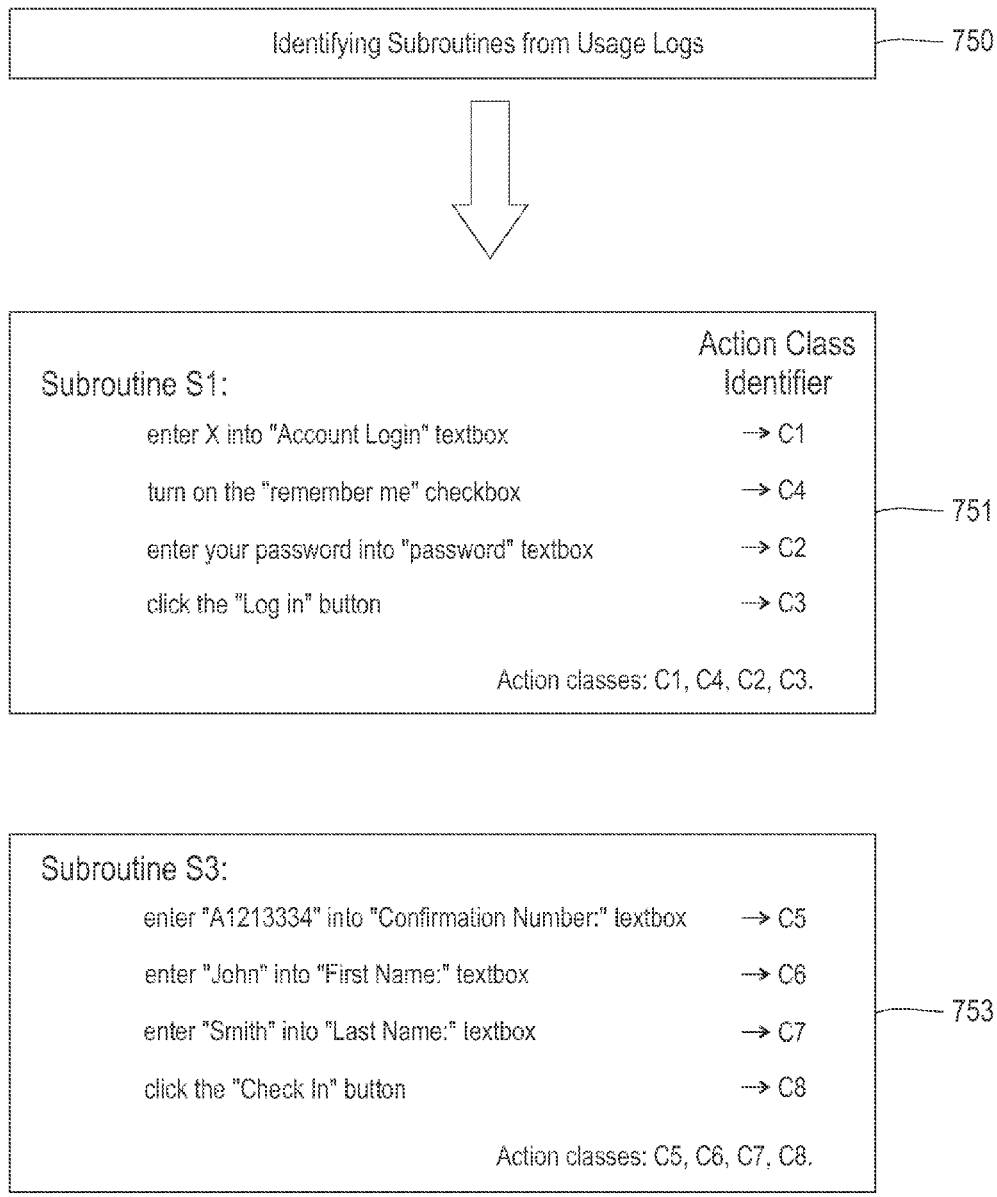
FIG. 7 illustrates multiple subroutines identified from the usage logs, according to an embodiment of the invention.

FIG. 7 illustrates example subroutines that may be identified from the usage information 650. From an analysis 750 of usage logs 650, the subroutine usage information analyzer 211 may identify two subroutines S1 (751) and S3 (753). Subroutine S1 (751) comprises the actions to log into a user account on the airlines' web site and corresponds to sequences 651 and 652 of user actions in the subroutine usage log 650. Subroutine S3 (753) comprises the actions to check in for a flight on the airlines' web site and corresponds to sequence 653 of the subroutine usage log 650.

Figure 8:
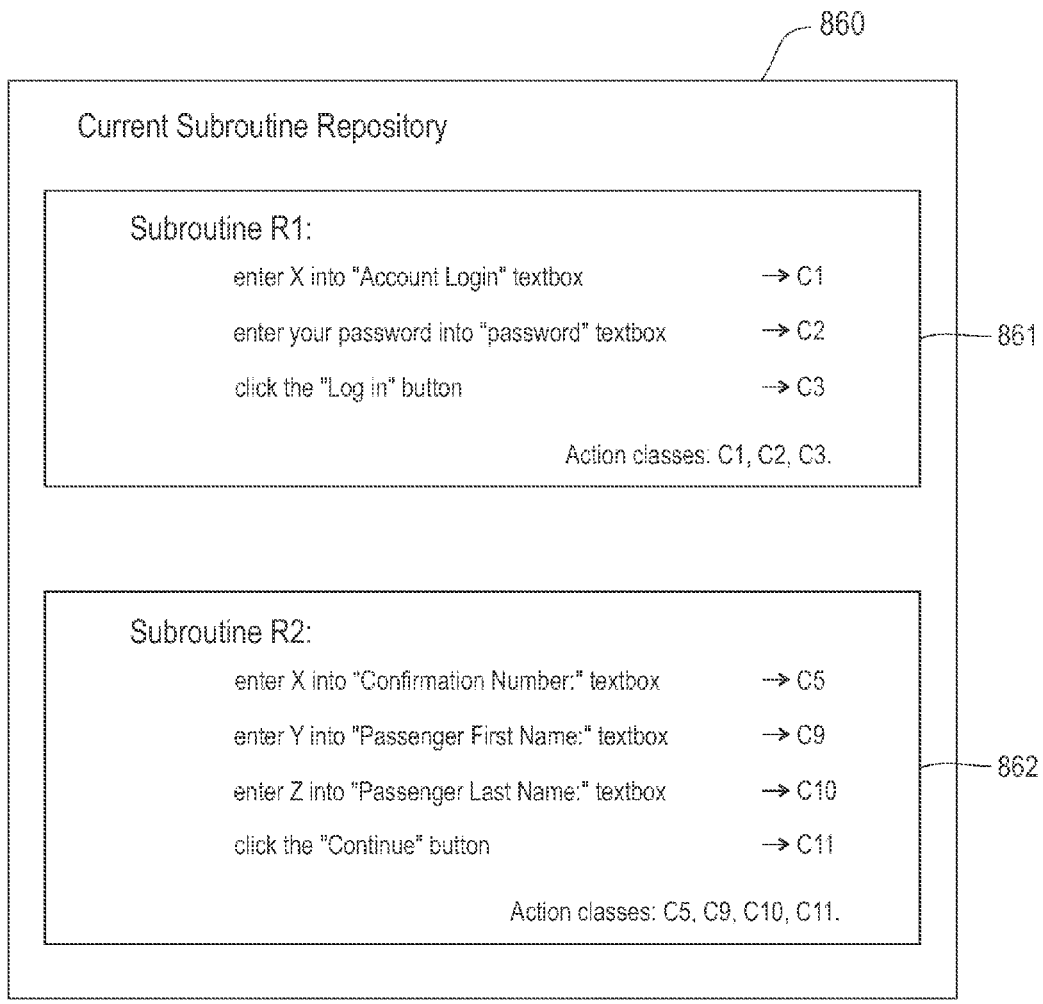
FIG. 8 illustrates a subroutine repository wherein some of the identified subroutines are not currently in the subroutine repository, according to an embodiment of the invention.

The subroutine usage information analyzer 211 may continue with the analysis of the usage log 650 by comparing the identified subroutines S1 (751) and S3 (753) against a subroutine repository 860, as illustrated in FIG. 8. This comparison may be performed by the subroutine comparator 212. In the illustrated example, the repository 860 currently includes two subroutines R1 (861) and R2 (862).

In one embodiment, each action in the subroutines in the repository 860 and those identified from the usage logs 650 may be represented as an action class identifier such as C1, C2, C3, . . . C11 as illustrated in FIGS. 7-8. Thus, the subroutine S1 (751) identified from the subroutine usage logs 650 may be represented as the sequence of action classes (C1, C4, C2. C3) and the subroutine S3 (753) may be represented as the sequence of action classes (C5, C6, C7, C8). The subroutines R1 (861) and R2 (862) may be respectively represented as the sequences of action classes (C1, C2, C3) and (C5, C9, C10, C11). Each of the action classes C1 to C11 respectively corresponds to a unique user or program action as determined by the action class mapper 321 as described above with reference to FIG. 3. The use of the action class identifiers facilitates the comparison of individual actions in the subroutines S1 (751) and S3 (753) identified from the usage logs 650 and the actions of the subroutines in the repository 860.

During the subroutine comparison, the subroutine comparator 212 may determine that the identified subroutine S1 (751) is not functionally equivalent to any of the subroutines 861-862 currently in the subroutine repository 860. However, the subroutine comparator 212 may determine that subroutine R1 (861) partially matches the identified subroutine S1 (751) based on their sequences of action classes. As a result, the subroutine repository updater 213 may modify the subroutine R1 (861) to make it consistent with the identified subroutine S1 (751) and store the modified subroutine R1 as subroutine 961 in the updated subroutine repository 960 of FIG. 9.

Figure 9:
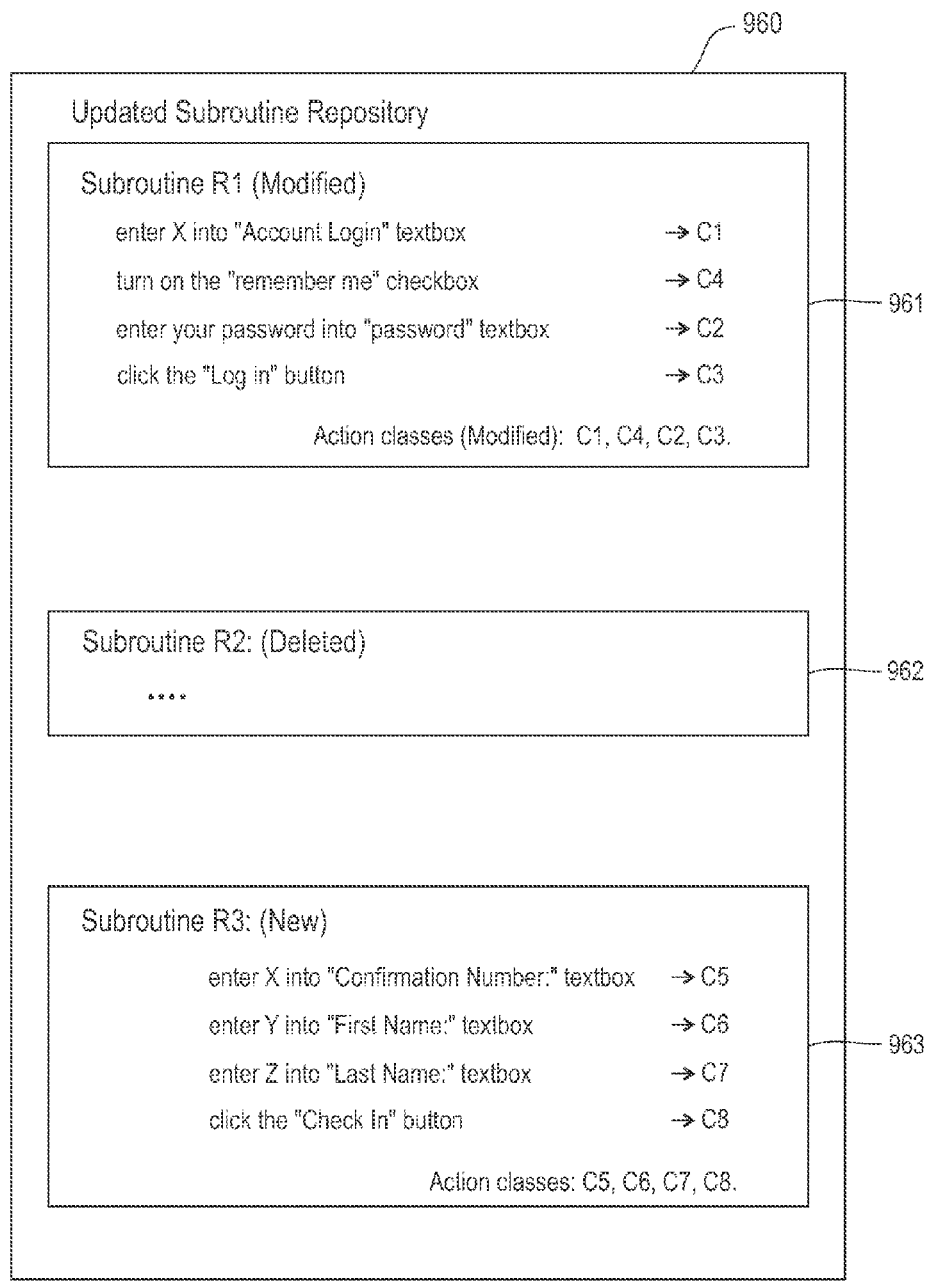
FIG. 9 illustrates an updated subroutine repository in which a new subroutine is added and an existing subroutine is modified as a result of a comparison between the subroutines identified from usage logs and the subroutines in a repository, according to an embodiment of the invention.

The subroutine comparator 212 may further determine that the other subroutine identified from the usage logs, S3 (753), does not completely or partially match any subroutine in the subroutine repository 860 and as a result, the subroutine repository updater 213 may add a new subroutine R3 (963) to the updated subroutine repository 960 illustrated in FIG. 9.

The subroutine comparator 212 may also determine that the subroutine R2 (862), which is currently in the subroutine repository 860, does not functionally match with any of the subroutines identified from the usage logs 650. As a result, the subroutine updating component 213 may delete subroutine R2 from the updated repository 960, as shown by the deleted subroutine 962 in FIG. 9.

Figure 10:
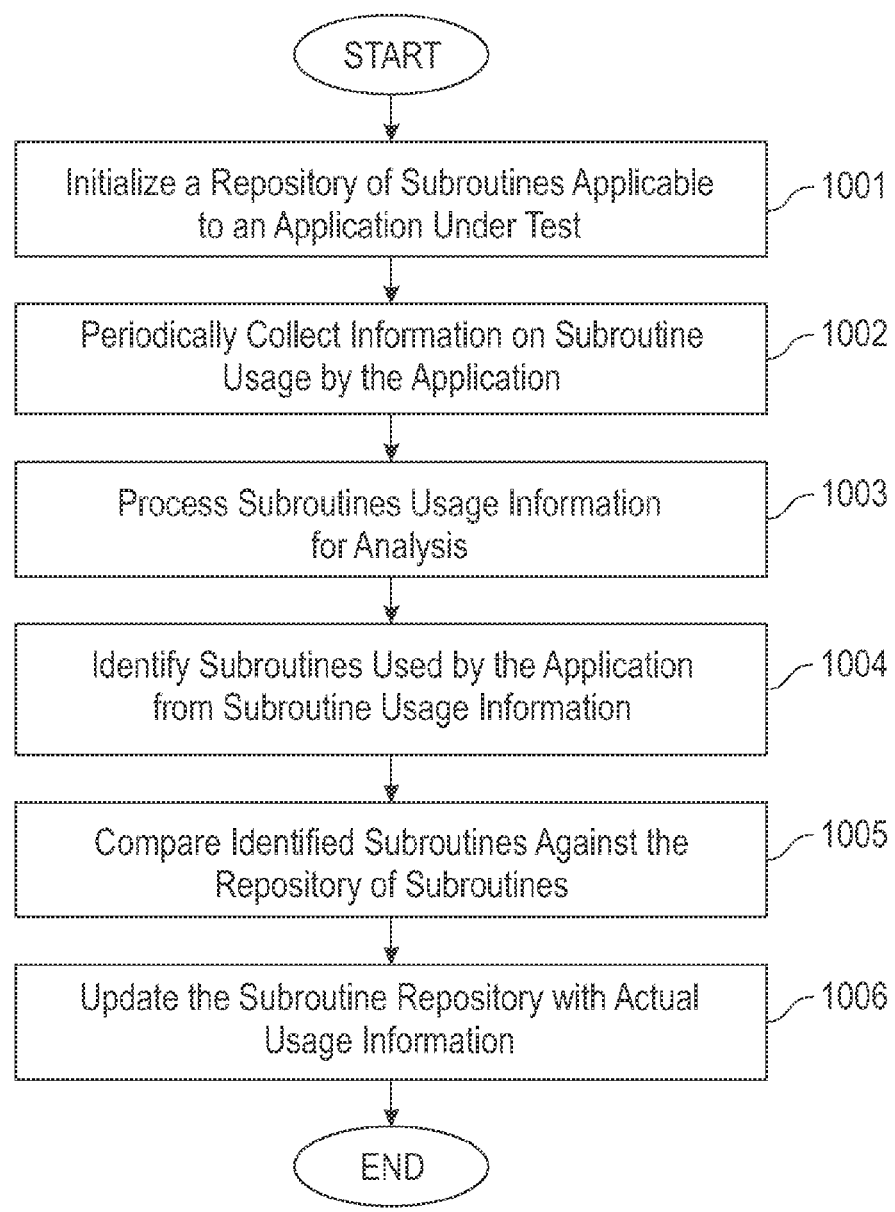
FIG. 10 is a flow chart of an exemplary process for analyzing subroutine usage logs to maintain a subroutine repository for an application under test, according to an embodiment of the invention.

FIG. 10 is a flowchart of an exemplary process for maintaining a repository of subroutines applicable to an application under 110 test by analyzing information on subroutine usage by the application and automatically updating the repository based on the analysis, according to an embodiment of the invention. The process may begin at step 1001 in which a software tester may initialize a subroutine repository 215 with a list of subroutines that the tester knows to be applicable to an application 110 being tested. The subroutine repository 215 may be a database that the maintenance system 105 accesses and maintains.

A subroutine usage information collector 210 may periodically collect information about the subroutines used by the application under test, per step 1002. Such subroutine usage information may comprise user or program action logs such as web action logs in the case of a web application being the application under test. In an embodiment, the web interactions in a web history log may be recorded using a browser plug-in which outputs each step of interaction in a language executable by web automation systems such as CoScripter.

In order to facilitate the identification of subroutines that may be used by the application under test from the subroutine usage information, the subroutine usage information analyzer 211 may pre-process the usage information at step 1003 before analyzing the information. In the case of web action logs, this pre-processing may comprise, for example, the operations performed by a pre-processing utility such as the one described in the paper entitled "Lowering The Barrier To Website Testing Using CoTester", IUI 2010, ACM 2010. The pre-processed web logs may be in the form of web log 431 in FIG. 4, which may include multiple groups 432-434 of web actions where each group comprises user actions that are related to a web transaction.

In one embodiment, the subroutine maintenance system 105 may convert a web history log into a form that is more suitable for detecting patterns of actions in the web log. In one embodiment, this conversion may include detecting an interacted web object using XPATH and a DOM tree for each step of the web log, identifying the object label, forming the triple <action, object, label> for the interaction, and generating a ClearScript statement from this triple using the grammar rules in the ClearScript language.

Once the subroutine usage logs 214 has been pre-processed into a format suitable for identifying the subroutines, the subroutine maintenance system 105 may analyze the subroutine usage logs 214 to identify subroutines used by the application under test, at step 1004. The analysis of the subroutine usage logs 214 may involve segmenting the usage logs 214 to detect sequences of related program or user actions from the information and classifying similar user or program actions into actions classes to generalize functionally similar tasks. The segmentation of the usage information logs 214 may be performed by a subroutine usage log segmenter 320 based on time such as by day or by hour. The subroutine usage log segmenter 320 may compute a time difference between successive logs and if the time difference is above a threshold, it may perform the segmentation of the logs. An example of the subroutines that the subroutine maintenance system 105 may identify from the user log 431 is the subroutine 435 illustrated in FIG. 4.

In an embodiment, the subroutine usage information analyzer 211 may map each user or program action in a sequence of related actions to an action class that represents functionally equivalent actions. Each detected sequence of related actions thus becomes a sequence of action classes. The use of action classes facilitates the comparison of the subroutines identified from the usage information logs 214 with the subroutines in the repository 215.

The subroutine maintenance system 105 may next compare the subroutines that it has identified from the subroutine usage logs 214 against the subroutines currently in the repository 215, at step 1005. A software tester may have initialized the subroutine repository 215 with a list of subroutines that the tester knows to be applicable to the application 110 under test. FIG. 5 illustrates an example of the comparison of the subroutines identified from usage logs 214 against the subroutines in a repository 215. As an example, the repository 215 currently includes one subroutine 541 which might have been provided by a software tester during an initialization. In one embodiment, a subroutine comparator 212 may compare the subroutine 435 which the usage information analyzer 211 has identified from web user logs 431 against subroutine 541 in the repository 215 and conclude that these subroutines match with each other. The subroutine comparator 212 may further return a message 542 to indicate that subroutine 435 is consistent with subroutine 541.

Figure 11:
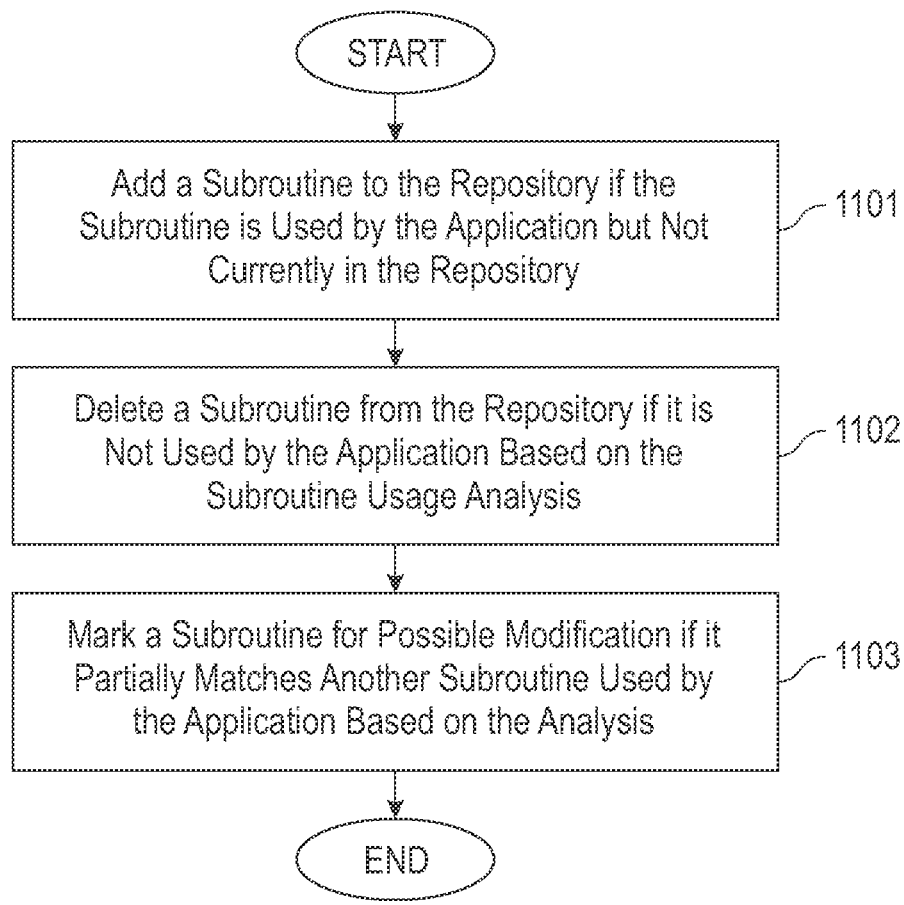
FIG. 11 illustrates an exemplary process for updating a subroutine repository in response to a comparison of the subroutines identified from usage logs against a subroutine repository, according to an embodiment of the invention.

In the case where one or more subroutines that usage information analyzer 211 has identified from usage logs 214 are not found in the subroutine repository 215, the subroutine maintenance system 105 may update the subroutine repository 215 with newly found subroutines or modified subroutines, per step 1006. The subroutine maintenance system 105 may also delete certain subroutines from the subroutine repository 215 if they are not used by the application 110 under test. The subroutine maintenance system 105 may comprise a subroutine updating component 213 for handling the task of updating the subroutine repository 215. FIG. 11 is a flowchart illustrating actions that the subroutine updating component 213 may perform in updating the subroutine repository 215.

Refer again to the example of subroutines identified from usage logs 650 as described above with reference to FIGS. 6-8. In this example, the subroutine maintenance system 105 identifies subroutine S3 (753) from the usage logs 650 as being used by the application 110 under test, however the current subroutine repository 860 does not include any subroutine that is functionally the same as subroutine S3 (753). As a result, a new subroutine R3 (963) corresponding to the subroutine S3 (753) is added to the updated repository 960 in FIG. 9, per step 1101 in FIG. 11.

Subroutine R2 (862) is currently in the subroutine repository 860; however, it was not identified as being used by the application under test from the analysis of usage logs 650. As a result, the subroutine updating component 213 may delete subroutine R2 (862) from the updated repository 960, per step 1102 of FIG. 11.

The subroutine maintenance system 105 has also identified subroutine S1 (751) as being used by the application 110 under test. In comparing subroutine S1 (751) to the subroutines currently in the repository 860, the subroutine comparator 212 cannot find any subroutine in the repository 860 that functionally matches subroutine S1 (751). However, the subroutine comparator 212 determines that subroutine R1 (861) in the repository 860 partially matches subroutine S1 (751) based on the number of matching action classes in subroutines S1 (751) and R1 (861). In one embodiment, the subroutine updating component 213 may modify subroutine R1 (861) to make it functionally equivalent to the actions performed by subroutine S1 (751) and then add the modified subroutine R1 (961) to the updated subroutine repository 960, per step 1103.

The subject matter described above is provided by way of illustration only and should not be construed as limiting. Various modifications and substitutions of the described components and operations can be made by those skilled in the art without departing from the spirit and scope of the present invention defined in the following claims, the scope of which is to be accorded the broadest interpretation so as to encompass such modifications and equivalent structures. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

As will be appreciated by one skilled in the art, aspects of the present invention may be embodied as a method, system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "component" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), Ethernet, SCSI, iSCSI, Fibre Channel, Fibre Channel over Ethernet, and Infiniband, or the connection may be made to an external computer, for example, through the Internet using an Internet Service Provider.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 12:
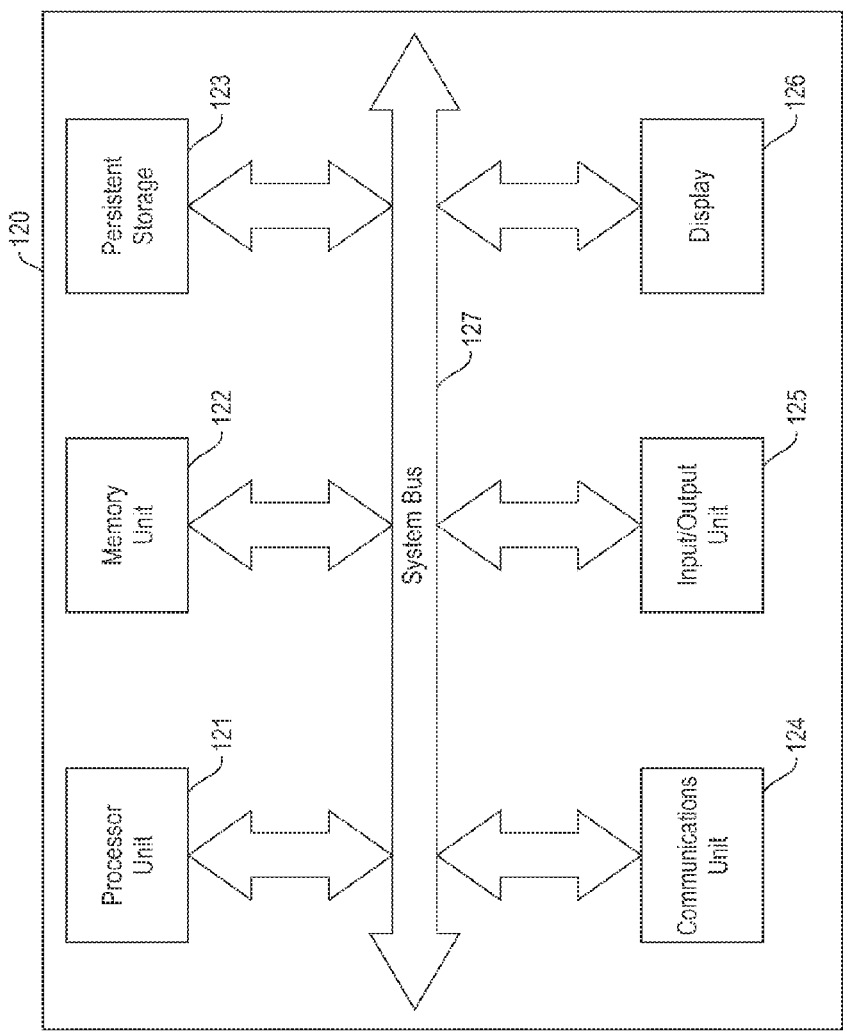
FIG. 12 illustrates an exemplary block diagram of a representative computer for analyzing subroutine usage logs and maintaining a subroutine repository for an application under test, according to an embodiment of the invention.

FIG. 12 illustrates an exemplary block diagram of a representative computer which may be incorporated in a computer 120. Computer system 120 may include a processor unit 121, a memory unit 122, a persistent storage 123, a communications unit 124, an input/output unit 125, a display 126 and a system bus 127. Computer programs are typically stored in persistent storage 123 until they are needed for execution by an operating system, at which time the programs are brought into the memory unit 122 so that they can be directly accessed by the processor unit 121.

The processor unit 121 selects a part of memory unit 122 to read and/or write by using an address that the processor 121 gives to memory 122 along with a request to read and/or write. Usually, the reading and interpretation of an encoded instruction at an address causes the processor 121 to fetch a subsequent instruction, either at a subsequent address or some other address. The processor unit 121, memory unit 122, persistent storage 123, communications unit 124, input/output unit 125, and display 126 interface with each other through the system bus 127.

The flowchart and block diagrams in the figures described above illustrate the architecture, functionality, and operation of possible implementations of systems, methods and computer program products according to various embodiments of the present invention. In this regard, each block in the flowchart or block diagrams may represent a component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system comprising: a data storage component for storing a log of subroutine usage by an application under test;
   a processor coupled to the data storage component and configured to:
   analyze the log to identify subroutines used by the application based on actions in the subroutines, wherein the identifying subroutines comprises:
      segment the log into sequences of related actions based on a time period;
      map each sequence of related actions into a sequence of action classes;
      analyze the resulting sequences of action classes to identify a common substring; and
      output the common substring as one of the subroutines used by the application;
   compare the identified subroutines against a repository of subroutines applicable to the application; and
   designate a first subroutine in the repository as a matching subroutine wherein the first subroutine is used by the application.

2. The system of claim 1, wherein the proce3ssor is configured to delete a second subroutine in the repository wherein the second subroutine is not used by the application.

3. The system of claim 1, wherein the processor is configured to add a second subroutine to the repository wherein the second subroutine is used by the application but not in the repository.

4. The system of claim 1, wherein the processor is configured to identify a second subroutine in the repository for modification wherein the second subroutine partially matches one of the subroutines used by the application.

5. A computer program product comprising a non-transitory computer readable storage medium having computer readable program code embodied therewith, the computer readable program code comprising: computer readable program code configured to analyze a log of subroutine usage by an application under test to identify subroutines used by the application based on actions in the subroutines, wherein the identifying subroutines comprises:
- segment the log into sequences of related actions based on a time period;
- map each sequence of related actions into a sequence of action classes;
- analyze the resulting sequences of action classes to identify a common substring; and
- output the common substring as one of the subroutines used by the application;
- computer readable program code configured to compare the identified subroutines against a repository of subroutines applicable to the application; and
- computer readable program code configured to designate a first subroutine in the repository as a matching subroutine wherein the first subroutine is used by the application.

6. The computer program product of claim 5, wherein the subroutine repository is initialized with a user list of subroutines.

7. The computer program product of claim 5, wherein each of the subroutines is a sequence of action steps.

8. The computer program product of claim 5, wherein the application under test is a web application and the subroutine usage log is a web interaction log.

9. The computer program product of claim 8, wherein the web interaction log comprises at least one of web links, web page selections, and input text.

10. The computer program product of claim 8, wherein the computer readable program code comprises computer readable program code configured to segment the web interaction log by day.

* * * * *